United States Patent
Zapolsky

(10) Patent No.: US 11,119,498 B2
(45) Date of Patent: Sep. 14, 2021

(54) SYSTEMS AND METHODS FOR SIMULATION UTILIZING A SEGMENTABLE MONOLITHIC MESH

(71) Applicant: Toyota Research Institute, Inc., Los Altos, CA (US)

(72) Inventor: Samuel Zapolsky, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 638 days.

(21) Appl. No.: 16/001,340

(22) Filed: Jun. 6, 2018

(65) Prior Publication Data

US 2019/0377358 A1   Dec. 12, 2019

(51) Int. Cl.
| | |
|---|---|
| G05D 1/02 | (2020.01) |
| G06T 19/00 | (2011.01) |
| G06T 17/20 | (2006.01) |
| G05D 1/00 | (2006.01) |
| G01S 17/08 | (2006.01) |
| G01S 17/86 | (2020.01) |
| G01S 17/931 | (2020.01) |

(52) U.S. Cl.
CPC ............ G05D 1/0248 (2013.01); G01S 17/08 (2013.01); G01S 17/86 (2020.01); G01S 17/931 (2020.01); G05D 1/0088 (2013.01); G05D 1/024 (2013.01); G06T 17/20 (2013.01); G06T 19/006 (2013.01); *G05D 2201/0211* (2013.01); *G05D 2201/0213* (2013.01); *G06T 2200/04* (2013.01)

(58) Field of Classification Search
CPC ............... G05D 1/0248; G05D 1/0088; G05D 2201/0211; G05D 2201/0213; G05D 1/024; G01S 17/08; G05T 17/20; G06T 2200/04; G06S 17/86
USPC ............................................ 703/2, 4; 345/473
See application file for complete search history.

(56) References Cited

U.S. PATENT DOCUMENTS

| | | | |
|---|---|---|---|
| 6,420,698 B1 * | 7/2002 | Dimsdale | G01S 7/4811 250/205 |
| 6,826,452 B1 | 11/2004 | Holland et al. | |
| 7,027,054 B1 * | 4/2006 | Cheiky | G06T 13/40 345/473 |
| 8,892,253 B2 | 11/2014 | Park et al. | |

(Continued)

*Primary Examiner* — Thai Q Phan
(74) *Attorney, Agent, or Firm* — Dinsmore & Shohl LLP

(57) ABSTRACT

Systems and methods for optimizing the simulation of a robot in an environment are disclosed herein. The system includes an environment sensor configured to generate signals indicative of objects within the environment. The system further includes a computing device having a processor and a non-transitory computer-readable memory and a machine-readable instruction set stored in the non-transitory computer-readable memory. The machine-readable instruction set causes the computing device to: generate a monolithic mesh of the environment such that the objects in the environment form a static rigid body with the environment, create an action plan for the simulation, identify objects within the monolithic mesh that the simulation intends to interact with, segment the objects that the simulation intends to interact with from the monolithic mesh, perform the simulation of the objects segmented from the monolithic mesh, and recombine the objects segmented from the monolithic mesh for the simulation with the monolithic mesh.

20 Claims, 6 Drawing Sheets

(56) References Cited

U.S. PATENT DOCUMENTS

| | | | |
|---|---|---|---|
| 9,400,503 B2 | 6/2016 | Kearns et al. | |
| 9,701,015 B2 | 7/2017 | Buehler et al. | |
| 9,804,598 B2 | 10/2017 | Yoshino | |
| 9,811,714 B2 | 11/2017 | Fu | |
| 10,217,275 B2* | 2/2019 | Berard | G06T 17/00 |
| 10,492,981 B1* | 12/2019 | Kumar | G06F 3/167 |
| 2005/0168460 A1* | 8/2005 | Razdan | G06F 16/2428 |
| | | | 345/419 |
| 2007/0071310 A1 | 3/2007 | Kobayashi et al. | |
| 2007/0297645 A1* | 12/2007 | Pace | G06K 9/6203 |
| | | | 382/103 |
| 2010/0017026 A1 | 1/2010 | Fletcher et al. | |
| 2011/0270593 A1* | 11/2011 | Meuris | G06F 17/13 |
| | | | 703/2 |
| 2013/0163836 A1* | 6/2013 | Pau | G06T 7/62 |
| | | | 382/128 |
| 2017/0089710 A1* | 3/2017 | Slusar | G01C 21/3602 |
| 2018/0012418 A1* | 1/2018 | Bêrard | G06T 17/00 |
| 2018/0035606 A1* | 2/2018 | Burdoucci | A01D 43/14 |

* cited by examiner

SYSTEMS AND METHODS FOR SIMULATION UTILIZING A SEGMENTABLE MONOLITHIC MESH

TECHNICAL FIELD

The present specification generally relates to systems and methods for simulating objects within an environment and, more specifically, to systems and methods for simulating select objects from a monolithic mesh of the environment while treating all other non-selected objects as a rigid static body in the environment.

BACKGROUND

Robotic systems designed to interact with objects in an environment may be simulated prior to interacting with objects in the real world. Conventional simulators utilize simulation techniques that define, update, and track the physical parameters of each object in the environment. Such systems and methods of simulation of objects typically require small step sizes, which for environments with many objects, may be computationally expensive. As such, simulation systems generally require dedicated processing resources and large amounts of time to conduct a simulation.

Accordingly, a need exists for alternative and optimized systems and methods for simulating objects in a cluttered environment.

SUMMARY

In one embodiment, a system for optimized simulation of a robot in an environment may include an environment sensor configured to generate one or more signals indicative of one or more objects within the environment and a computing device communicatively coupled to the environment sensor. The computing device includes a processor, a non-transitory computer readable memory, and a machine-readable instruction set stored in the non-transitory computer readable memory. The machine-readable instruction set causes the computing device to perform at least the following when executed by the processor: generate a monolithic mesh of the environment based on the one or more signals from the environment sensor indicative of the one or more objects within the environment such that the one or more objects in the environment form a static rigid body with the environment, create an action plan for the simulation, and identify one or more objects within the monolithic mesh that the simulation intends to interact with based on the action plan. The machine-readable instruction set further causes the computing device to segment the one or more objects that the simulation intends to interact with based on the action plan from the monolithic mesh, perform the simulation of the one or more objects segmented from the monolithic mesh, and recombine the one or more objects segmented from the monolithic mesh for the simulation with the monolithic mesh.

In another embodiment, a method of simulating a robot in an environment may include generating a monolithic mesh of the environment and identifying one or more objects within the monolithic mesh that a simulation intends to interact with during the simulation. The method may further include segmenting the one or more objects that the simulation intends to interact with from the monolithic mesh, performing the simulation of the one or more objects segmented from the monolithic mesh, and recombining the one or more objects segmented from the monolithic mesh for the simulation with the monolithic mesh.

In yet another embodiment, a vehicle may include an environment sensor configured to scan an environment and generate one or more signals indicative of one or more objects within the environment and a computing device communicatively coupled to the environment sensor. The computing device includes a processor, a non-transitory computer readable memory, and a machine-readable instruction set stored in the non-transitory computer readable memory. The machine-readable instruction set causes the computing device to perform at least the following when executed by the processor to simulate an action plan within the environment. The simulation includes generating a monolithic mesh of the environment based on the one or more signals from the environment sensor indicative of the one or more objects within the environment such that the one or more objects in the environment form a static rigid body with the environment, and identifying one or more objects within the monolithic mesh that the simulation intends to interact with based on the action plan. The simulation further includes segmenting the one or more objects that the simulation intends to interact with based on the action plan from the monolithic mesh performing the simulation of the one or more objects segmented from the monolithic mesh, adjusting the action plan in response to one or more results of the simulation, and recombining the one or more objects segmented from the monolithic mesh for the simulation with the monolithic mesh. The machine-readable instruction set further causes the computing device to execute the adjusted action plan within the environment in response to the one or more results of the simulation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein include systems and methods for optimizing the simulation of robotic systems in environments. More particularly, for improving the efficiency and speed of simulations in cluttered environments. Embodiments provided herein disclose simulation methods that treat all objects in an environment as a rigid body, as referred to herein as a "monolithic mesh" of the environment, until an object or objects are to be simulated or interacted with during a simulation. In such embodiments, the object or objects may be segmented from the monolithic mesh, simulated, and then returned to the monolithic mesh. By treating the environment as a monolithic mesh, the simulation may avoid small step sizes otherwise required to track, update, and simulate all the objects in an environment. This may be especially useful in cluttered environments where a simulation intended to simulate one or a few objects may lose efficiency and speed as processing resources are allocated to tracking, updating, and simulating all objects in the environment.

In some embodiments, the improvement in speed and efficiency of simulations may not only improve offline simulations but may also allow active systems to simulate an action plan prior to executing the maneuver within the environment. In other words, active systems such as robotic systems functioning within a real environment may also benefit from the ability to rapidly and efficiently simulate a maneuver before executing it. For example, which will be discussed in more detail herein, autonomous vehicles or in-home human support robots may be capable of simulating a command or action in real time or near real time based on the particular environment and then may adjust the command or action before executing it to deliver a more accurate response. Simulating the actions of a robotic system through the application of the systems and methods described herein may improve actual performance of the robotic system.

Figure 1:
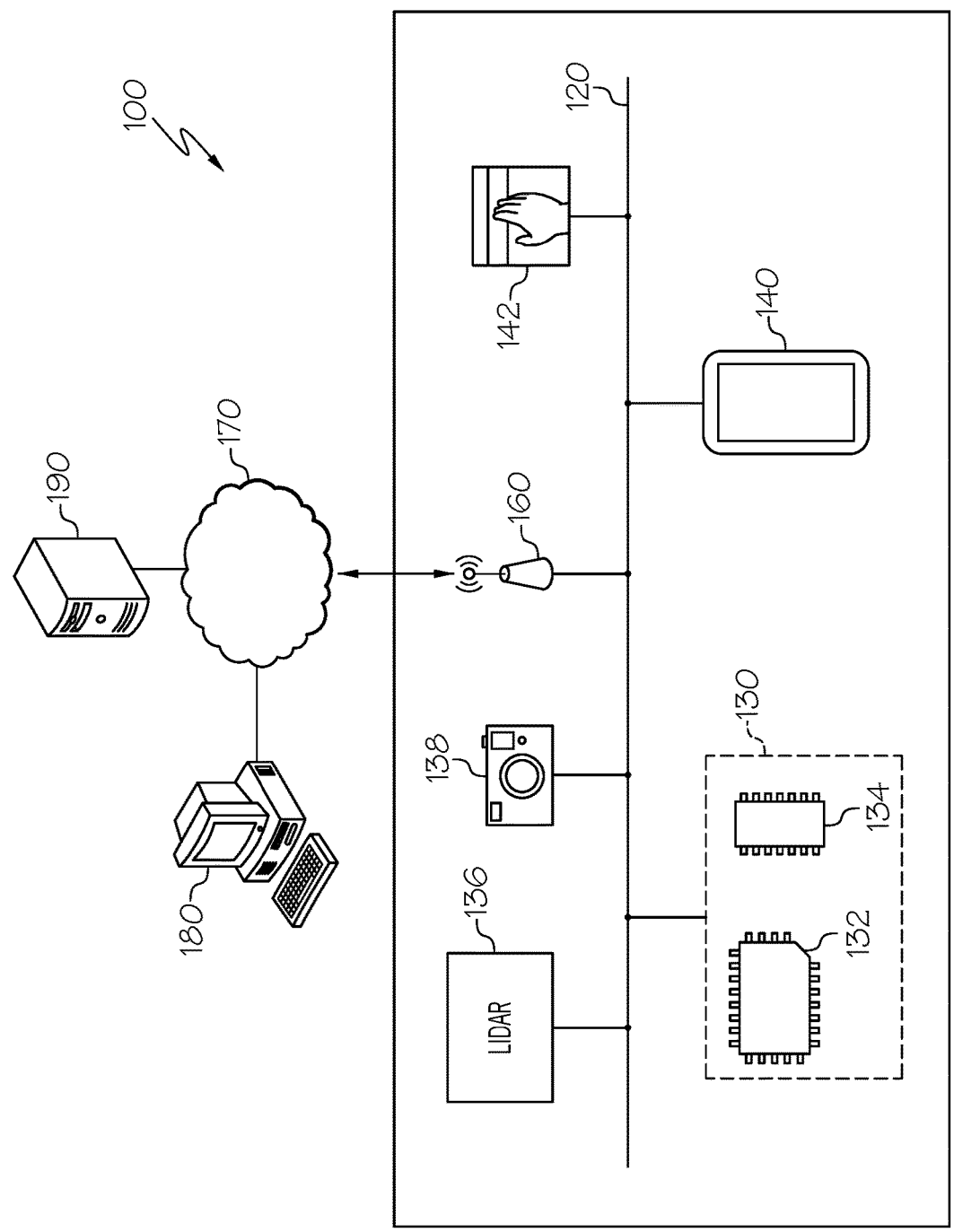
FIG. 1 depicts a system for simulating selected objects from a monolithic mesh of the environment according to one or more embodiments shown and described herein.

Turning now to the drawings where like numbers refer to like structures, and particularly to FIG. 1, a system 100 for simulating one or more objects in an environment using a monolithic mesh of the environment is depicted. In some embodiments, the system 100 may be employed with a computing device using a virtual environment or in an active system in a real-world environment within a robotic system. When deployed on a computing device using a virtual environment, the virtual environment may include, for example, a 3D rendering of a real-world environment and/or utilize sensor data collected from a real-world environment to replicate a real-world environment in virtual form. An active system in a real-world environment may include any robotic system, for example without limitation, an autonomous vehicle, a Human Support Robot, or the like which may include the components described herein to enable the system 100 for simulating one or more objects in an environment using a monolithic mesh of the environment.

The system 100 generally includes a communication path 120, a computing device 130 comprising a processor 132 and a non-transitory computer-readable memory 134, a LIDAR system 136, a camera 138, a display 140, an input device 142, and network interface hardware 160. The system 100 may be communicatively coupled to a network 170 by way of the network interface hardware 160. The network 170 may further communicatively couple a local computing device 180 and/or a remote computing device or database 190 to the system 100. The components of the system 100 may be physically coupled or may be communicatively and operably coupled through the communication path 120 and/or the network 170. The various components of the system 100 and the interactions thereof will be described in detail herein.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors 132, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the computing device 130 may be any device or combination of components comprising a processor 132 and non-transitory computer-readable memory 134. The processor 132 of the system 100 may be any device capable of executing the machine-readable instruction set stored in the non-transitory computer-readable memory 134. Accordingly, the processor 132 may be an electric controller, an integrated circuit, a microchip, a computer, or any other computing device. The processor 132 may be communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer-readable memory 134 of the system 100 is coupled to the communication path 120 and communicatively coupled to the processor 132. The non-transitory computer-readable memory 134 may comprise RAM, ROM, flash memories, hard drives, or any non-transitory memory device capable of storing a machine-readable instruction set such that the machine-readable instruction set can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer-readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer-readable memory 134, other embodiments may include more than one memory module.

In some embodiments, the system 100 may include one or more environment sensors. Two examples of an environment sensor are described herein, a LIDAR system 136 and one or more cameras 138. However, it should be understood that the environment sensor may be any sensor or combination of sensors configured to scan an environment and generate one or more signals corresponding to objects, edges, contours, or the like, which may be used to develop a computer-readable representation of the environment. In some embodiments, the one or more signals from the environment sensors may be utilized by a simultaneous localization and mapping (SLAM) algorithm that constructs and/or updates a map of the environment and may simultaneously localize and track of the robotic system within the environment. For example, Cartographer, a SLAM algorithm, may be implemented with the LIDAR system 136 to generate a map of the environment and compute the position of the LIDAR system 136 within the environment.

In some embodiments, an environment sensor may include a LIDAR system 136. The LIDAR system 136 is communicatively coupled to the communication path 120 and the computing device 130. A LIDAR system 136 (or alternatively referred to as a Light Detection and Ranging system) is a system that uses pulsed laser light to measure distances from the LIDAR system 136 to objects that reflect the pulsed laser light. A LIDAR system 136 may be made of solid-state devices with few or no moving parts, including those configured as optical phased array devices where its prism-like operation permits a wide field-of-view without the weight and size complexities associated with a traditional rotating LIDAR system 136. The LIDAR system 136 is particularly suited to measuring time-of-flight, which in turn can be correlated to distance measurements to objects that are within a field-of-view of the LIDAR system 136. By calculating the difference in time of the various wavelengths of the pulsed laser light emitted by the LIDAR system 136, a digital 3D representation of a target object or environment may be generated. The pulsed laser light emitted by the LIDAR system 136 may be output in or near the infrared range of the electromagnetic spectrum, for example, at about 905 nanometers.

Environment sensors such as LIDAR systems 136 can be used by a vehicle and/or robotic system to provide detailed 3D spatial information for the identification of objects near the vehicle and/or robotic system, as well as for mapping, navigation, and/or autonomous operations. In some embodiments, a LIDAR system 136 may be implemented with geo-referencing devices such as GPS or a gyroscope-based inertial navigation unit (INU) or related dead-reckoning system. In some embodiments, the LIDAR system 136 generates one or more signals in response to objects, surfaces, and/or contours detected in an environment. The one or more signals may be communicated to the computing device 130 where the computing device 130 may generate a representation of the environment that the LIDAR system 136 is scanning.

In some embodiments, an environment sensor may include one or more cameras 138. The one or more cameras 138 may be communicatively coupled to the communication path 120 and to the processor 132. The one or more cameras 138 may be any device having an array of sensing devices (e.g., pixels) capable of detecting radiation in an ultraviolet wavelength band, a visible light wavelength band, or an infrared wavelength band. The one or more cameras 138 may have any resolution. The one or more cameras 138 may be an omni-directional camera or a panoramic camera. In some embodiments, one or more optical components, such as a mirror, fish-eye lens, or any other type of lens may be optically coupled to each of the one or more cameras 138.

In operation, the one or more cameras 138 capture image data and transmit the image data to the computing device 130. The image data may be communicated to the computing device 130 as one or more signals corresponding to objects, contours, bright spots, dark spots, edges, or the like within the environment. The image data may be received by the processor 132, which may process the image data using one or more image processing algorithms. Any known or yet-to-be developed video and image processing algorithms may be applied to the image data in order to identify an item or determine a location of an item relative to other items in an environment. Example video and image processing algorithms include, but are not limited to, kernel-based tracking (mean-shift tracking) and contour processing algorithms. In general, video and image processing algorithms may detect objects and movement from sequential or individual frames of image data. One or more object recognition algorithms may be applied to the image data to estimate three-dimensional objects to determine their relative locations to each other. For example, structure from motion, which is a photogrammetric range imaging technique for estimating three-dimensional structures from image sequences, may be used. Object recognition algorithms may include, but are not limited to, scale-invariant feature transform ("SIFT"), speeded up robust features ("SURF"), and edge-detection algorithms. In some embodiments, the object detection approach referred to as YOLO, described in more detail in "You Only Look Once: Unified, Real-Time Object Detection," by Redmon et al., may be used. In other embodiments, the "Common Objects in Context" (COCO) algorithm, described in more detail in "Microsoft COCO: Common Objects in Context," by Lin et al., may be implemented for object detection, segmentation, and captioning. It should be understood that these are only examples of object detection, segmentation, and image analysis algorithms. Any known or yet-to-be-developed object recognition, detection, segmentation, and/or image analysis algorithms may be used to extract and label objects, edges, dots, bright spots, dark spots or even optical characters and/or image fragments within the image data.

In some embodiments, an environment sensor such as a LIDAR system 136 or one or more cameras 138, which are provided as non-limiting examples herein, may not be implemented in the system 100. In such embodiments, the information provided by the environment sensor to the system 100 may be replaced with a 3D rendering of an environment, for example, developed using computer-aided design (CAD) software.

Still referring to FIG. 1, the system 100 may include a display 140 for providing a visual output, for example, to project a representation of the environment. The display 140 is coupled to the communication path 120. Accordingly, the communication path 120 communicatively couples the display 140 with other modules of the system 100. The display 140 may include any medium capable of transmitting an optical output such as, for example, a cathode ray tube, light emitting diodes, a liquid crystal display, a plasma display, or the like. Moreover, the display 140 may be a touchscreen that, in addition to providing optical information, detects the presence and location of a tactile input upon a surface of or adjacent to the display 140. Accordingly, each display 140 may receive mechanical input directly upon the optical output provided by the display 140. Additionally, the display 140 may be the display 140 of a portable personal device such as a smart phone, tablet, laptop or other electronic device. Additionally, it is noted that the display 140 can include one or more processors 132 and one or more non-transitory computer-readable memories 134. While the system 100 includes a display 140 in the embodiment depicted in FIG. 1, the system 100 may not include a display 140.

In some embodiments, an input device 142 may be a separate device from the display 140. The input device 142 may be coupled to the communication path 120 and communicatively coupled to the processor 132. The input device 142 may be any device capable of transforming user contact into a data signal that can be transmitted over the communication path 120 such as, for example, a button, a lever, a switch, a knob, a touch sensitive interface, a microphone or the like. In some embodiments, the input device 142 includes a lever for activating the turn signal, a power button, a volume button, an activation button, a scroll button, or the like. In some embodiments, the input device 142 includes a pressure sensor, a touch-sensitive region, a pressure strip, or the like. It should be understood that some embodiments may not include the input device 142 or may include more than one input device 142.

The network interface hardware 160 is coupled to the communication path 120 and communicatively coupled to the computing device 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170.

In some embodiments, the system 100 may be communicatively coupled to nearby a local computing device 180 and/or a remote computing device or database 190 via the network 170. In some embodiments, the network 170 is a personal area network that utilizes Bluetooth technology to communicatively couple the system 100 to the local computing device 180 and/or the remote computing device or database 190. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 170 may be utilized to communicatively couple the system 100 with a local computing device 180 and/or a remote computing device or database 190. In some embodiments, the network 170 may communicatively couple the system 100 to the internet. That is, the system 100 may access numerous amounts of information from remote computing devices or databases 190. For example, the system 100 may search the internet for information or parameters of an object to be simulated. As described in more detail herein, when an object to be simulated is segmented from the monolithic mesh, the system 100 may identify the object and search the internet or connected database via the network interface hardware 160 and the network 170 to determine information about the object such as an inertia, a shape, a center of mass, a coefficient of friction, a mass, and a dimension.

The following sections will now describe embodiments of the operation of the system 100 for optimizing a simulation of robotic systems in an environment. Embodiments provided herein disclose simulation systems and methods that treat all objects in an environment as a static rigid body until one or more objects are to be simulated or interacted with as a result of simulating the one or more objects. In such embodiments, the one or more objects may be segmented from the monolithic mesh, simulated, and then returned to the monolithic mesh.

Figure 2:
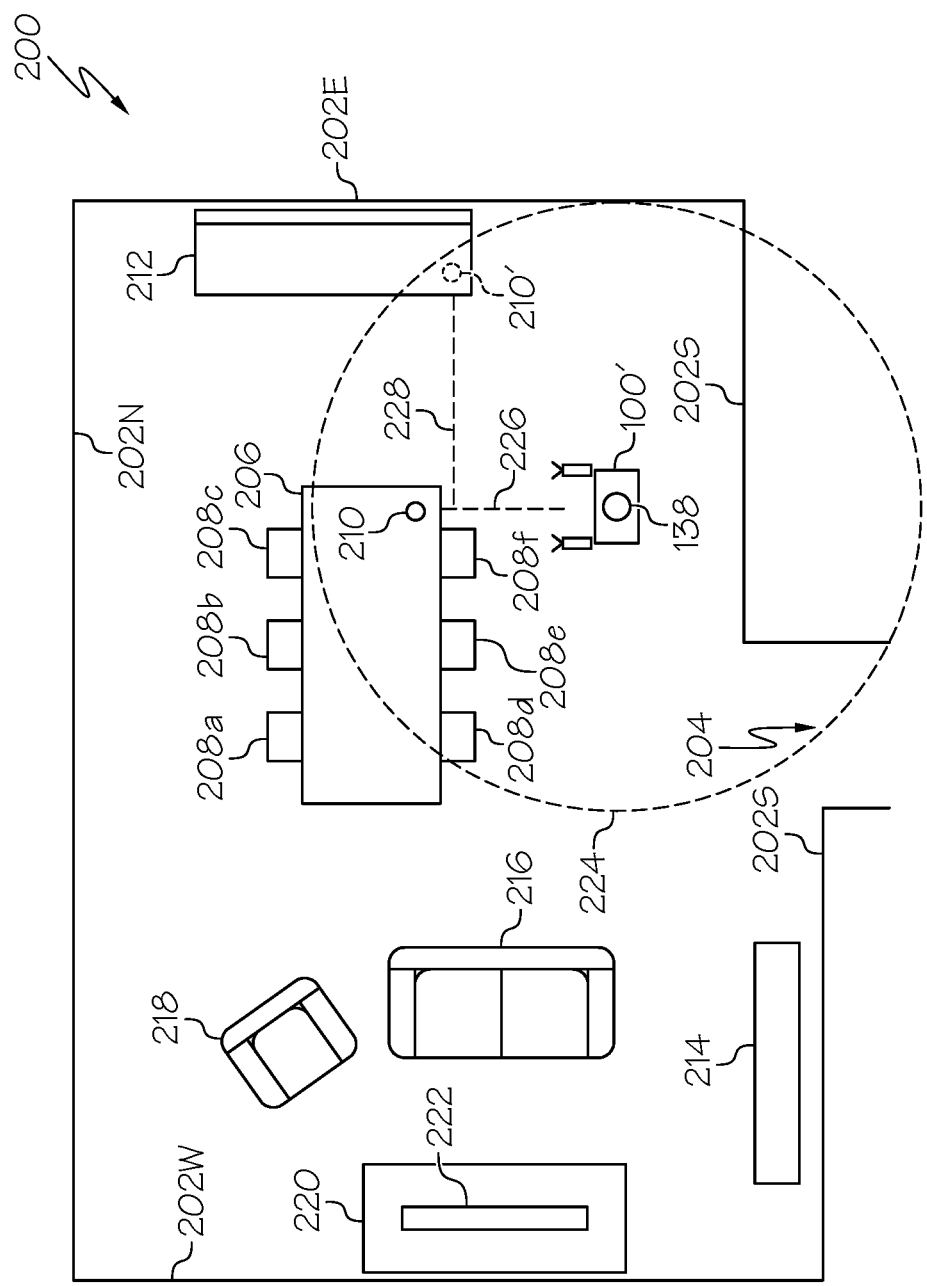
FIG. 2 depicts an illustrative environment including a robotic system which is simulated according to one or more embodiments shown and described herein.

Referring now to FIG. 2, an illustrative top-down view of an environment 200 for simulating a robotic system 100' within is depicted. As depicted, the environment 200 includes a robotic system 100' having a camera 138. The robotic system 100' may be a human support robot or the like. The example environment 200 is defined by walls 202 (i.e., 202N, 202E, 202S, 202W) and a doorway 204. The environment includes a table 206 with chairs 208 (i.e., 208a-208f) positioned around the table 206. A drinking glass 210 is located on the table 206. The environment further includes a hutch 212, a side table 214, a couch 216, a sofa chair 218, and a TV stand 220 with a TV 222 positioned on top of it. The environment 200 depicted in FIG. 2 may be a real-world environment or may be a virtually generated environment. In either case the environment 200 depicted is intended to provide context for describing the functionality of systems and methods for simulating a robotic system 100' in an environment 200 using a monolithic mesh of the environment 200.

In some embodiments, the robotic system 100' may be programmed to execute a task. For example, the task may include moving an object from one location to another location such as moving a drinking glass 210 from the table 206 to a location 210' on the hutch 212. In such an example, the robotic system 100' may be programmed with instructions to find the drinking glass 210 on the table 206 and move it to the hutch 212. As a result, the robotic system 100' may generate a more complete action plan for carrying out the task by running a simulation within the environment 200. For example, the action plan may include advancing to the table 206 along path 226, collecting the drinking glass 210, reversing, turning, and advancing along path 228 to the hutch 212 and placing the drinking glass 210 at location 210' on the hutch. In some embodiments, the action plan may be a high-level instruction set such as in the example described herein (i.e., to find the drinking glass 210 on the table 206 and move it to the hutch 212). In some embodiments, the action plan may be a detailed set of instructions outlining each operational step (e.g., actuator commands and drive motor activation setting) of the robotic system 100' for carrying out the task.

Figure 3:
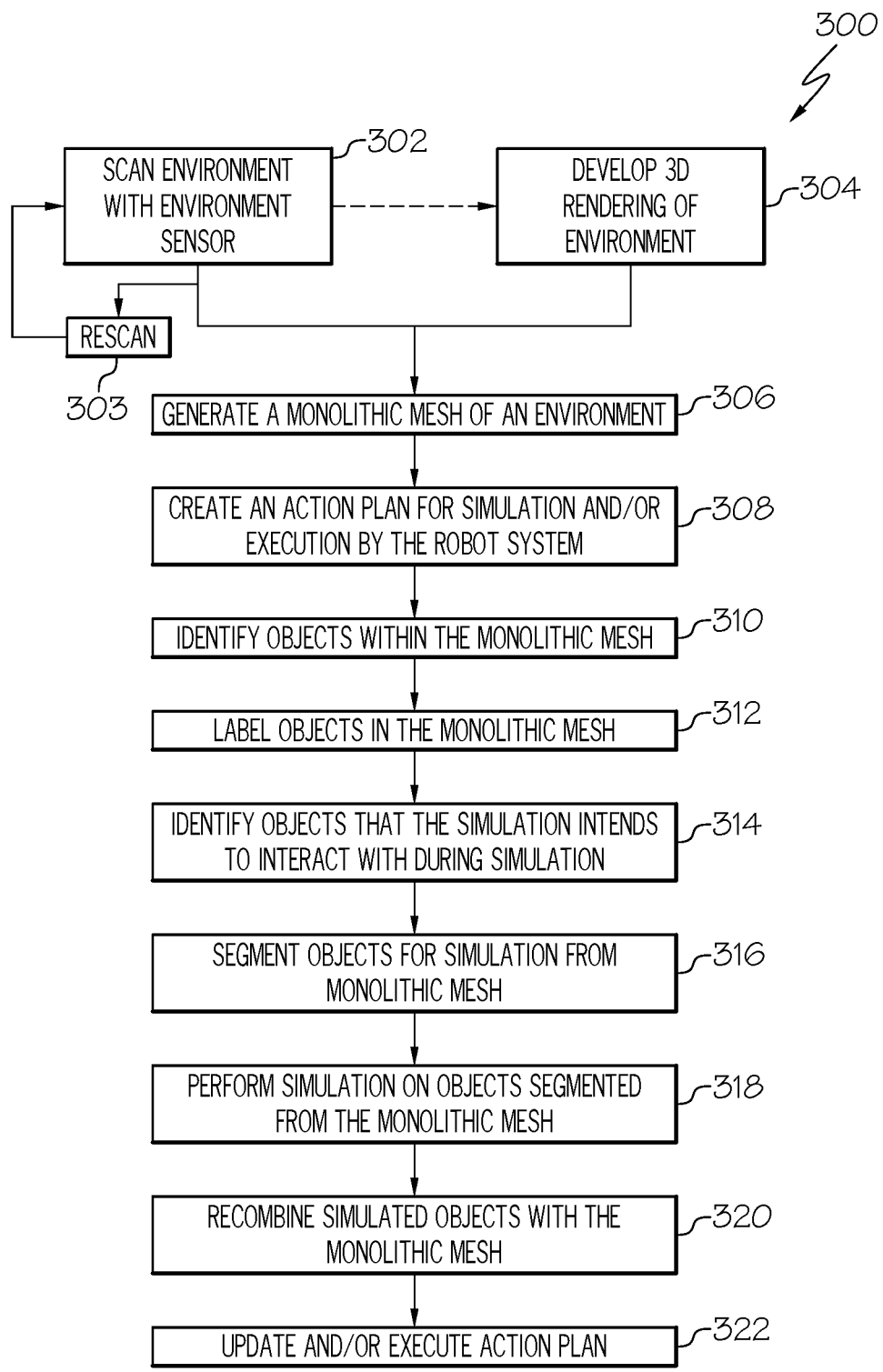
FIG. 3 depicts a flow diagram of a method for simulating objects using a monolithic mesh of the environment according to one or more embodiments shown and described herein.

Referring now to FIGS. 2 and 3, systems and methods of simulating a robotic system 100' interacting with objects in an environment 200 will now be described. FIG. 3 depicts a flow diagram of a method for simulating objects using a monolithic mesh of the environment 200. In some embodiments, a robotic system 100' may be a virtual instance of a real robotic system 100' placed in a virtual environment 200 or the robotic system 100' may be a physical robotic system 100' placed in a real-world environment 200. The virtual environment 200 may be a 3D rendering of an environment generated, for example, using CAD software. It should be understood that in a virtual environment, the components of the system 100 may be virtual components configured to generate a response representative of an actual component in a real-world environment.

In block 302, the robotic system 100' may scan the environment 200 using an environment sensor, for example, a LIDAR system 136, one or more cameras 138 or the like. The scan of the environment 200 may provide the robotic system 100' with information about the environment 200 such as what and where objects are in the environment 200. In block 304, for virtual environments, a 3D rendering of the environment 200 may be developed. The 3D rendering of the environment 200 may be used as an analogue to the one or more signals generated by the environment sensors in a simulation occurring in a real-world environment 200. In some embodiments, as depicted in block 303, the environment sensors may rescan the environment 200. The rescan may occur on command or in defined intervals. The rescan may allow the simulation to determine transient and non-transient objects within the environment 200.

In block 306, the system generates a monolithic mesh of the environment 200, the 3D rendering of the environment obtained from the scan of the environment 200. A monolithic mesh, as used herein, refers to a model of an environment 200 where all the objects and constraints (e.g., walls, floors, and ceilings) are treated as a single static rigid body. The objects may retain their perceived shapes and sizes based on the scan of the environment but are not further defined until the simulation intends on interacting with the object. For example, a table and the floor on which the table is positioned may be treated as a single connected body. That is, the monolithic mesh may not include relationship parameters such as forces, coefficients of friction, or other parameters that define the table and the floor and the interaction between the table and the floor. For example, the physics involved in preventing the table from floating in air (i.e., forces due to gravity) or from passing through the floor (i.e., the force of the floor pushing on the table in response to gravity) are not defined within the monolithic mesh. Additionally, the monolithic mesh may not define the mass of an object or any other parameter beyond the visually perceived shape and size within the environment based on the scan by the environment sensor. As a result, the monolithic mesh may be a lightweight and versatile model for simulation purposes.

In block 308, the method for simulating an object within an environment creates or receives an action plan for simulation and/or execution by the robotic system 100'. The action plan may include instructions for the robotic system 100' to execute. For example, an action plan may include instructions for the robotic system 100' to perform a task, navigate a space, or the like. Referring to FIG. 2, the action plan may include instructions for the robotic system 100' to find the drinking glass 210 on the table 206 and relocate it to a location 210' on the hutch 212. The action plans may include generic commands that the robotic system 100' must interpret into detailed actions or the action plan may include a set of detailed instructions for carrying out the intended task.

Figure 5:
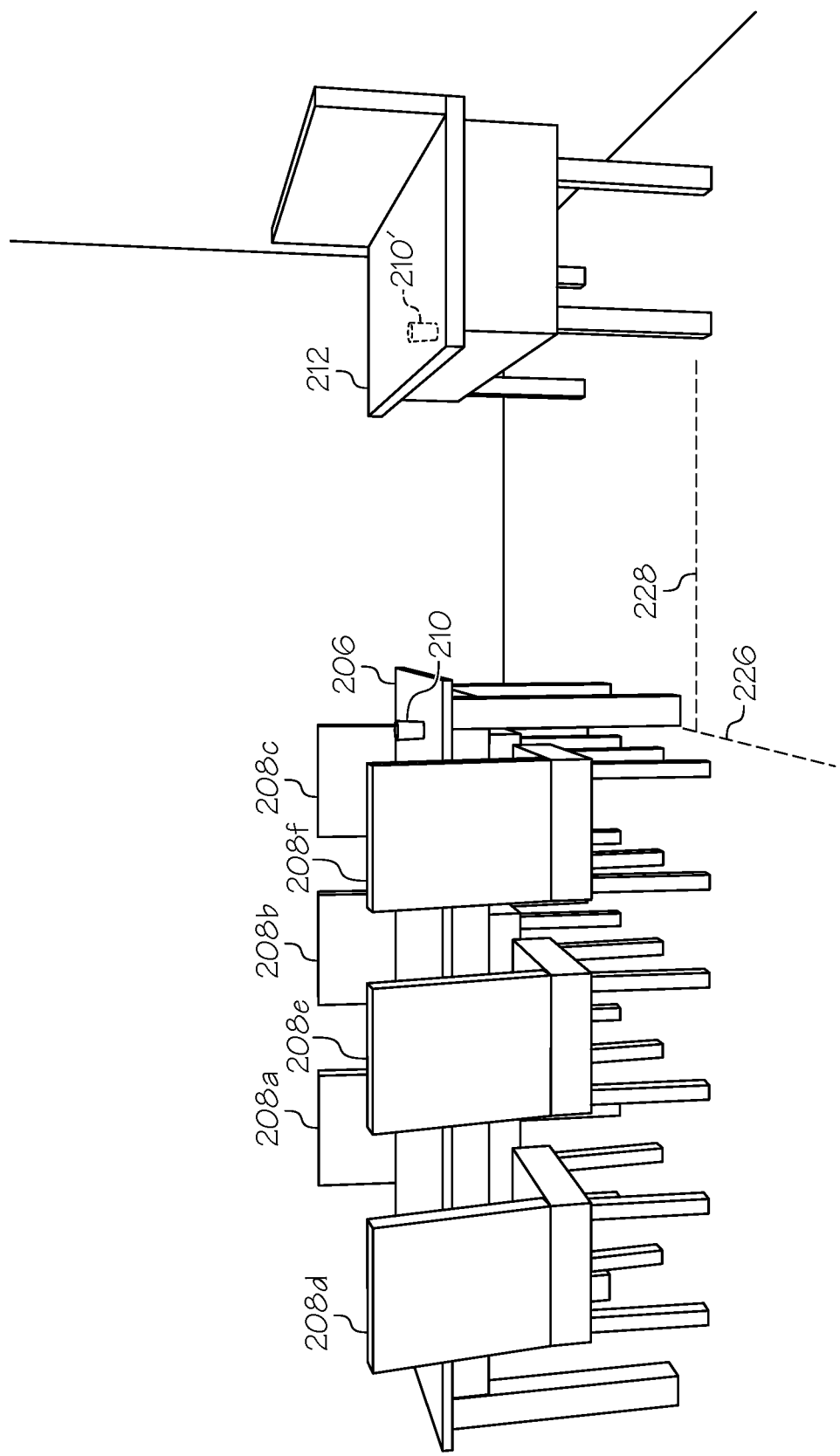
FIG. 5 depicts an illustrative view of an environment from a robotic system according to one or more embodiments shown and described herein.

In some embodiments, the robotic system 100' may include a communicatively coupled display 140 that projects a representation of the environment 200 and an input device 142 may be used to generate an action plan for the robotic system 100' to simulate. For example, the display 140 may project an image of the environment 200, such as a top-down view as shown in FIG. 2, a view from the one or more cameras 138 on the robotic system 100', for example, as shown in FIG. 5, or another electronic representation of the environment 200 that a user may view and interact with. In some embodiments, the user may virtually select an object in the environment 200 through the display 140 and/or the input device 142 and then provide a command or set of instructions defining what the robotic system 100' should do with the object. These user interactions may be compiled into an action plan to be simulated and possibly executed by the robotic system 100'. In some embodiments, the action plan may include a route or the identification of a destination location that the robotic system 100' should navigate. In such embodiments, the route (e.g., 226 and 228) may be adjusted or defined through the simulation process based on the location of the robotic system 100' within the environment 200.

In block 310, the objects within the monolithic mesh may be identified. For example, an object detection algorithm may be used to generate labels for objects within the monolithic mesh of the environment 200. As mentioned above, object recognition, detection, segmentation, and/or image analysis algorithms may include algorithms such as YOLO or COCO, which may result in detecting and labeling different objects within the monolithic mesh of the environment 200. That is, in some embodiments a monolithic mesh may include a static rigid body model of an environment 200 where objects within the environment 200 are labeled. In some embodiments, the degree of definition a label provides for an object may vary. An object may have a generic label, a detailed label, or no label. This may depend on the object recognition, detection, and segmentation algorithm being employed. Labels that are more detailed may be needed for objects closer to a robotic system 100' than those at a distance from the robotic system 100'. For example, objects between a first distance 224 (FIG. 2) and the environment sensor of a robotic system 100' (e.g. camera 138) may be defined with detailed labels whereas objects beyond the first distance 224, optionally up to or beyond a second distance may be defined with generic labels or no labels. For example, referring back to FIG. 2, the table 206, the chairs 208d-208f, and the hutch 212 are shown to be at least partially or fully included within the first distance 224. As such, these objects may be defined with detailed labels, for example, table 206 as a table, chairs 208d-208f as chairs, and the hutch 212 as a hutch. Conversely, the objects not included within the first distance 224, may be defined with generic labels. For example, chairs 208a-208c as furniture, side table 214 as furniture, couch 216 as furniture, sofa chair 218 as furniture, TV stand 220 as furniture, and TV 222 as appliance. That is, with respect to the simulation of the robotic system 100' within the environment 200, for example, objects at a greater distance from the robotic system 100' may be of less importance and are less likely to be interacted with during the simulation as those closer to the robotic system 100'. In some embodiments, objects that are beyond the first distance 224 from the robotic system 100' may not be labeled. In some embodiments, no label may be assigned and the object may be treated as a contour within the monolithic mesh. In some embodiments, labels may be assigned to objects within the field of view of the camera 138. For example, FIGS. 5 and 6, which are discussed in more detail below, illustrate a field of view of a camera 138 coupled to the robotic system. As a result, the computational load in defining elements within the monolithic mesh may be reduced and the data set required for generating, maintaining, and updating the monolithic mesh during a simulation may be reduced, resulting in more efficient and faster simulations.

Referring still to FIGS. 2 and 3, in block 314 of FIG. 3, the method may further include identifying objects within the monolithic mesh, which the robotic system 100' intends to interact with during the simulation. Identification of objects within the monolithic mesh of the environment 200 may occur prior to executing the simulation. That is, the system 100 employing the method 300 may utilize the action plan and the monolithic mesh to estimate which objects will be interacted with in performing the simulation. Objects may also be identified during a simulation, for example, when the robotic system 100' or one of the objects being simulated interacts with another object that was not previously identified. In such a case, the system 100 employing the method 300 may identify that object and segment it from the monolithic mesh for continued simulation as will be described in more detail herein.

Referring again to the example of the robotic system 100' finding a drinking glass 210 on the table 206 and relocating it to a location 210' on the hutch 212 as illustrated in FIG. 2, the system 100 employing the method 300 may identify the table 206, the drinking glass 210 and the hutch 212 as objects the robotic system 100' will interact with during the simulation. In block 316, the method 300 may segment each of the identified objects from the monolithic mesh. Segmenting may include defining each of the objects as an individual entity. In this example, there are now four entities that the system 100 is concerned with during the simulation: the monolithic mesh, the table 206, the drinking glass 210, and the hutch 212. Additionally, segmenting may include defining inertia, a center of mass, a coefficient of friction, a mass, or the like for each of the objects segmented from the monolithic mesh. The system 100 may define these parameters and others by searching a local database including objects and estimated parameters, searching internet sources such as product listings, or searching a remote computing device or database 190. The search parameters may be drawn from object recognition algorithms. Furthermore, the shape and the dimensions of the object may be further refined now that the object will be simulated. For example, physical parameters of the drinking glass 210 may be determined by using the image search function of an internet-based search engine where a segmented image of the drinking glass 210 from the monolithic mesh is uploaded, and a product listing for the object which includes physical parameters of the object such as inertia, a center of mass, a coefficient of friction, a mass, and/or the dimensions or the like is located from the search results.

In block 318, simulation of the one or more objects is performed. The simulation may include loading a model of the robotic system 100' into the monolithic mesh and executing the action plan. The simulation may plan and execute a series of control functions, which represent the functionality of a real-world version of the robotic system 100' being simulated. In some embodiments, robot simulation may include multiple models of components of the robotic system 100'. Through the simulation process, the control functions and/or values thereof, the action plan, and other parameters such as the perceived or estimated physical parameters of the objects being simulated may be updated.

In some embodiments, the simulation of the robotic system 100' in the environment 200 may cause the robotic system to interact with an object that was not previously segmented for simulation. For example, the robotic system 100' while traversing the environment 200 along path 226, as illustrated in FIG. 2, may collide with the chair 208f while in the process of collecting the drinking glass 210 from the table 206. In such a case, the system 100 may segment the chair 208f from the monolithic mesh and simulate the collision between the chair 208f and the robotic system 100'. In response, the simulation may update the action plan of the robotic system 100' in collecting the drinking glass 210 to avoid a collision with the chair 208f or the robotic system 100' may plan to move the chair 208f during approach.

In block 320, once simulation of the objects is complete, the objects are returned to the monolithic mesh. That is, the physical parameters defined during the segmentation process may be removed from the objects and the objects once again become part of the static rigid body making up the monolithic mesh. In some embodiments, segmentation of objects from the monolithic mesh, simulation of the objects, and recombination of the objects with the monolithic mesh may occur in stages. For example, again referring to the relocation of the drinking glass 210, initially the system 100 may segment the table 206 and the drinking glass 210 from the monolithic mesh proceed along path 226 and collect the drinking glass from the table 206. At this point, the simulation does not intend on interacting with the table 206 through the remainder of the simulation. Therefore, the system 100 may return the table 206 to the monolithic mesh, however, while maintaining the drinking glass 210 as a segmented object. Next, the system 100 may proceed along path 228 as planned to relocate the drinking glass 210 onto the hutch 212. At some point before simulating placement of the drinking glass 210 onto the hutch 212, the system 100 segments the hutch 212 from the monolithic mesh and defines its physical parameters. The simulation may then continue with simulating the placement of the drinking glass 210 at location 210' on the hutch 212. As a result, only simulating objects that are currently being interacted with during the simulation may optimize the computational load of the simulation.

In block 322, the action plan may be updated based on the results of the simulation. In some embodiments, the action plan, once simulated, may be executed by the robotic system in the real-world environment.

Figure 4:
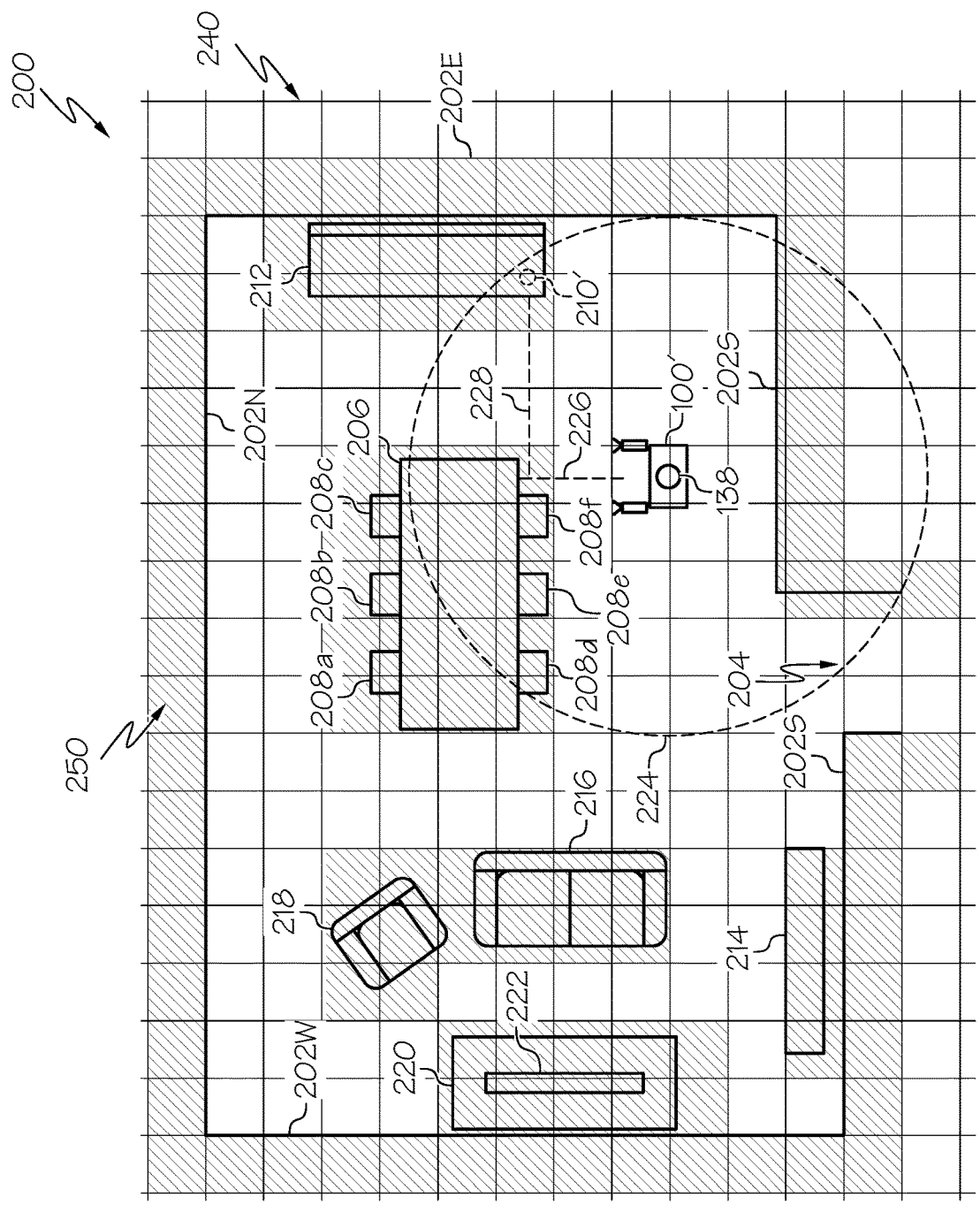
FIG. 4 depicts an occupancy map of an illustrative environment for simulating objects using a monolithic mesh of the environment according to one or more embodiments shown and described herein.

Referring now to FIG. 4, an illustrative top-view of an environment 200 having a robotic system 100' for simulation is depicted along with an occupancy grid 240 overlay. In some embodiments, the system may generate an occupancy grid 240 from the one or more signals generated by the environment sensors. The occupancy grid 240 may be a 2D occupancy grid or a 3D occupancy grid. The occupancy grid 240 may be used for navigating and localizing objects within an environment 200. In some embodiments, the implementation of an occupancy grid 240 identifies volumes within the environment 200, which are occupied, and those that are free space. The occupancy grid 240 may provide a robotic system 100' with an approximation of where objects are in the environment 200 such that when the robotic system 100' enters or approaches a quadrant 250 of the occupancy grid 240 which indicates that it is occupied at least in part by an object the robotic system 100' may become more sensitive to its movements and sensor readings. The incorporation of an occupancy grid with a monolithic environment may allow a robotic system 100' to simulate traversal of portions of the environment with minimal computational loads on the processing resources of the system 100. That is, the occupancy grid 240 may provide a high level estimation of where objects are located in the environment and thus when the robotic system 100' is simulated in the quadrants 250 indicated as free space the system 100 may operate at a reduced computational load as compared to simulating activities in or near quadrants 250 indicating occupancy of one or more objects.

Referring now to FIG. 5, an illustrative view of an environment from the viewpoint of the robotic system 100' (FIG. 2) is illustrated. In some embodiments, the system 100 may be implemented in a robotic system 100' within a real-world environment. In other embodiments, the system 100 may be implemented in conjunction with a virtual robotic system 100' in a computer-generated environment. The illustrative view in FIG. 5 may be an example of the monolithic mesh of the environment generated based on the environment sensors or a 3D rendering of the environment. As such, the robotic system considers each of the objects as part of a single rigid body until the object is to be interacted with during the simulation. In the example depicted in FIG. 5, again the drinking glass 210 to be relocated from the table 206 to location 210' on the hutch 212 is depicted in the view of the robotic system 100'. In some embodiments, only the drinking glass 210 is segmented from the monolithic mesh. As discussed above, physical properties are defined for the drinking glass 210 once it is segmented from the monolithic mesh. Where the table 206 and the hutch 212 are not segmented even though they support the drinking glass 210 in the environment, the system 100 during the simulation may assume an opposing force to the forces initially defined for the resting drinking glass 210. In other words, since the table 206 and the hutch 212 provide a force opposing that of the force due to gravity on the drinking glass 210, the simulation may assign that opposing force to the portion of monolithic mesh to achieve the same result as segmenting and simulating the table 206 and the hutch 212 as individual objects in the environment.

Figure 6:
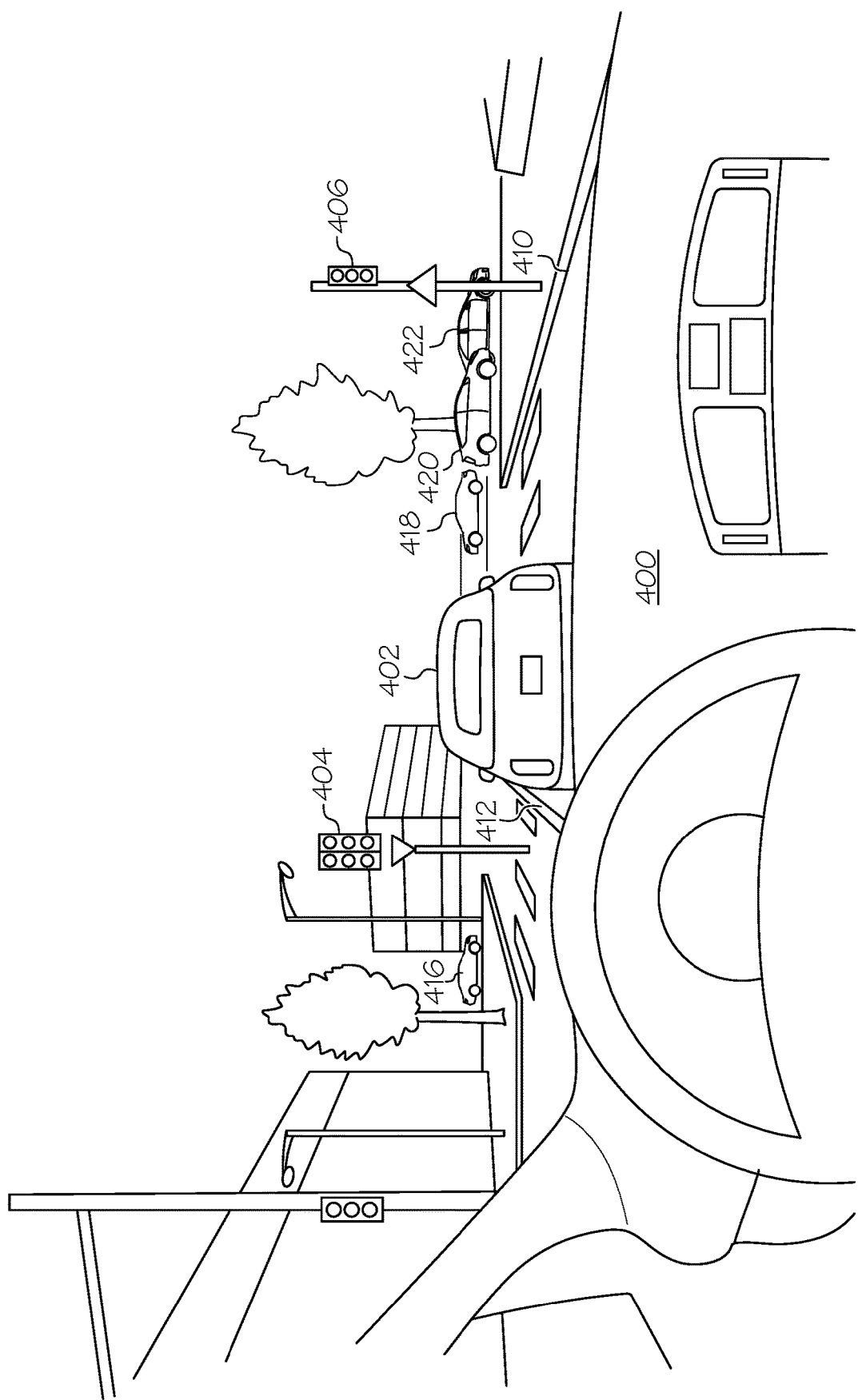
FIG. 6 depicts an illustrative view of an environment including an autonomous vehicle according to one or more embodiments shown and described herein.

It should be understood that although the systems and methods of optimizing the simulation of objects in an environment using a monolithic mesh are previously described with respect to segmenting and simulating the action of relocating an object from one surface to another, the scope of the systems and methods described herein are not limited to such applications. Referring now to FIG. 6, an illustrative view of an environment including an autonomous vehicle 400 is depicted. In some embodiments, the systems and methods of optimizing the simulation of objects in an environment using a monolithic mesh may be applied to simulating autonomous vehicles 400. For example, the system 100 may be incorporated in an autonomous vehicle 400 located in an environment such as an intersection. The autonomous vehicle 400 may include an action plan to traverse the intersection and arrive at a predefined destination. By way of example, the autonomous vehicle 400 including the system 100 may generate a monolithic mesh of the environment of the depicted intersection. The autonomous vehicle 400 may simulate a route through the intersection based on the other objects identified in the environment. For example, assuming that the traffic lights 404 and 406 are red and the autonomous vehicle 400 and the leading vehicle 402 are stopped at the intersection on the road defined between a left curb 412 and a right curb 410, the autonomous vehicle 400 may begin to simulate routes and events that may occur or impede traversal of the intersection once the traffic lights 404 and 406 turn green.

For example, the autonomous vehicle 400 may segment the leading vehicle 402 from the monolithic mesh and simulate following the leading vehicle 402 through the intersection and responding to various maneuvers from the leading vehicle 402 that may affect traversal through the intersection. In some embodiments, a sudden stop or a change in the lane of travel of the leading vehicle 402 may be simulated. In other situations, the autonomous vehicle 400 may segment and simulate situations where vehicle 416 and/or vehicle 418 may enter the intersection while autonomous vehicle 400 is traveling through it. In this manner, the autonomous vehicle 400 may run many simulations and generate various responses to many situations in an efficient manner without large computational load on the processing power of the system.

In other embodiments, an autonomous vehicle 400 may be a vehicle attempting to park in a parking space. In such a situation, the maneuvers required to enter the parking space may be simulated prior to the vehicle autonomously maneuvering into the parking space. These are only a few examples of how an optimized system and method for simulating objects in an environment using a monolithic mesh where only the objects to be simulated are segmented and simulated, thereby increasing the speed and efficiency of a simulation.

It should now be understood that systems and methods described herein are directed to optimizing simulation of objects in an environment using a monolithic mesh where the objects that the simulation intends to interact with are segmented from the monolithic mesh, simulated and returned to the monolithic mesh. It should also be understood that the systems and methods described herein may be implemented in a computing system for simulating objects in a virtual environment as well as implemented in a physical robotic system, which may simulate actions before executing the action in the real-world environment. In some embodiments, environment sensors may be used to gather information about an environment such as the position of objects relative to each other to generate a monolithic mesh of the environment. Objects in the environment may be recognized and labeled using object detection, recognition, and semantic segmentation algorithms. The labels may vary in detail depending on the proximity of the object to the robotic system within the environment. An action plan may be generated or received by the system and objects according to the action plan, which will be interacted with when the action plan is simulated, may be segmented from the monolithic mesh. The segmented objects may be further defined with physical properties for simulating their interaction with the robotic system and other objects within the environment. Once the objects are simulated, they may be returned to the monolithic mesh thereby removing or holding constant their physical properties while they are part of the monolithic mesh. That is, the physical properties may not be updated or exist as part of the objects within the monolithic mesh. In response to the simulation, the action plan may be updated and or executed by the robotic system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for optimized simulation of a robot in an environment comprising:
an environment sensor configured to generate one or more signals indicative of one or more objects within the environment;
a computing device communicatively coupled to the environment sensor, the computing device configured to:
generate a monolithic mesh of the environment based on the one or more signals from the environment sensor indicative of the one or more objects within the environment such that the one or more objects in the environment form a static rigid body with the environment,
create an action plan for the simulation,
identify one or more objects within the monolithic mesh that the simulation intends to interact with based on the action plan,
segment the one or more objects that the simulation intends to interact with based on the action plan from the monolithic mesh, wherein segmenting includes defining a parameter for the one or more objects based on the one or more signals from the environment sensor,
perform the simulation of the one or more objects segmented from the monolithic mesh, and
recombine the one or more objects segmented from the monolithic mesh for the simulation with the monolithic mesh.

2. The system of claim 1, wherein the environment sensor comprises a camera with a field of view of the environment, the camera generates one or more signals corresponding to image data captured by the camera of the environment.

3. The system of claim 2, wherein the computing device is further configured to:
assign labels to the one or more objects within the field of view of the environment captured by the camera.

4. The system of claim 3, wherein the one or more objects between the camera and a first distance from the camera are assigned a detailed label, the one or more objects between the first distance and a second distance are assigned a generic label, and the second distance is greater than the first distance from the camera.

5. The system of claim 1, wherein the environment sensor comprises a LIDAR system, the LIDAR system generates one or more signals corresponding to distance measurements between the LIDAR system and the one or more objects in the environment.

6. A method of simulating a robot in an environment comprising:
generating a monolithic mesh of the environment;
identifying one or more objects within the monolithic mesh that a simulation intends to interact with during the simulation;
segmenting the one or more objects that the simulation intends to interact with from the monolithic mesh, wherein segmenting includes defining one or more parameters for the one or more objects based on one or more signals from an environment sensor;
performing the simulation of the one or more objects segmented from the monolithic mesh; and
recombining the one or more objects segmented from the monolithic mesh for the simulation with the monolithic mesh.

7. The method of claim 6, wherein the one or more parameters include at least one of the following: an inertia, a shape, a center of mass, a coefficient of friction, a mass, and a dimension.

8. The method of claim 7, wherein the one or more parameters include an approximation of an actual value determined from a database.

9. The method of claim 8, further comprising updating the approximation of the actual value of the one or more parameters in response to performing the simulation of the one or more objects.

10. The method of claim 8, wherein the one or more parameters of the one or more objects are removed from the one or more objects when the one or more objects are recombined with the monolithic mesh.

11. The method of claim 6, wherein the monolithic mesh of the environment is generated in response to one or more signals from an environment sensor configured to scan the environment.

12. The method of claim 11, further comprising scanning the environment with the environment sensor, wherein the environment sensor generates one or more signals indicative of objects detected within the environment.

13. The method of claim 12, further comprising repeating the scan of the environment to identify non-transient objects within the environment.

14. The method of claim 11, wherein the environment sensor comprises a camera with a field of view of the environment, the camera generates one or more signals corresponding to image data captured by the camera of the environment.

15. The method of claim 11, wherein the environment sensor comprises a LIDAR system, the LIDAR system generates one or more signals corresponding to distance measurements between the LIDAR system and the one or more objects in the environment.

16. A vehicle comprising:
an environment sensor configured to scan an environment and generate one or more signals indicative of one or more objects within the environment;
a computing device communicatively coupled to the environment sensor, the computing device is configured to:
simulate an action plan within the environment, wherein a simulation includes:
generating a monolithic mesh of the environment based on the one or more signals from the environment sensor indicative of the one or more objects within the environment such that the one or more objects in the environment form a static rigid body with the environment,
identifying one or more objects within the monolithic mesh that the simulation intends to interact with based on the action plan,
segmenting the one or more objects that the simulation intends to interact with based on the action plan from the monolithic mesh, wherein segmenting includes defining a parameter for the one or more objects based on the one or more signals from the environment sensor, performing the simulation of the one or more objects segmented from the monolithic mesh, adjusting the action plan in response to one or more results of the simulation, and recombining the one or more objects segmented from the monolithic mesh for the simulation with the monolithic mesh; and execute the adjusted action plan within the environment in response to the one or more results of the simulation.

17. The vehicle of claim 16, wherein the action plan includes automatically navigating an intersection.

18. The vehicle of claim 16, wherein the environment sensor comprises a camera with a field of view of the environment, the camera generates one or more signals corresponding to image data captured by the camera of the environment.

19. The vehicle of claim 18, wherein the computing device is further configured to:

assign labels to the one or more objects within the field of view of the environment captured by the camera.

20. The vehicle of claim 19, wherein the one or more objects between the camera and a first distance from the camera are assigned a detailed label, the one or more objects between the first distance and a second distance are assigned a generic label, and the second distance is greater than the first distance from the camera.

* * * * *